United States Patent [19]

Makihara

[11] Patent Number: 5,129,053
[45] Date of Patent: Jul. 7, 1992

[54] WORD PROCESSOR UTILIZING IMAGE INPUTTING MEANS

[75] Inventor: Yachiyo Makihara, Nagoya, Japan

[73] Assignee: Brother Kogyo Kabushiki Kaisha, Aichi, Japan

[21] Appl. No.: 64,857

[22] Filed: Jun. 19, 1987

[30] Foreign Application Priority Data

Jun. 20, 1986 [JP] Japan .................. 61-142864

[51] Int. Cl.⁵ ............................................. G06F 15/62
[52] U.S. Cl. ...................................... 395/149; 395/117
[58] Field of Search ................. 364/519, 200 MS File, 364/900 MS File, 401, 406, 407, 408; 400/61, 63, 76, 279; 340/706

[56] References Cited

U.S. PATENT DOCUMENTS

| | | | |
|---|---|---|---|
| 4,403,301 | 9/1983 | Fessel | 400/63 X |
| 4,564,302 | 1/1986 | Hatazawa | 400/279 X |
| 4,649,513 | 3/1987 | Martin et al. | 364/900 |
| 4,651,288 | 3/1987 | Zeising | 364/519 |
| 4,658,366 | 4/1987 | Posh | 400/279 X |
| 4,672,186 | 6/1987 | Van Tyne | 364/900 X |
| 4,677,585 | 6/1987 | Ikegami et al. | 400/279 X |

Primary Examiner—Gary V. Harkcom
Assistant Examiner—Mark K. Zimmerman
Attorney, Agent, or Firm—Kane, Dalsimer, Sullivan, Kurucz, Levy, Eisele and Richard

[57] ABSTRACT

In a word processor for inputting desired data for each specific items and regulating a printing device for inputted data to be printed at each specific position on a fixed document form set in the printing device, the image of the fixed document form is read and inputted by an image reader or the like to display it on a graphic display device. The positions where the specific items should be inputted are designated by utilizing a dot unit cursor also displayed on the graphic display device and the position data for each designated input position is converted to an amount of the movement of the printing head of the printing device and an amount of the line feeding thereof. Then, the specific items are inputted at each input position on the image of the fixed document form displayed on the graphic display. The inputted data are then printed by the printing device on each column of the fixed document form where the corresponding data should be printed.

5 Claims, 4 Drawing Sheets

TO: _____  NO. _____
              DATE: _____
      DEBIT NOTE
PROFESSIONAL CHARGE:
        US$ _____
DISBURSEMENTS:
        US$ _____
    TOTAL: US$ _____

*FIG. 2*

| PRINTING STARTING POSITION |
| PRINTING TERMINATION POSITION |
| TYPE OF CHARACTER |
| CHARACTER SIZE |
| CHARACTER EMBELLISHMENT |
| ROW EDITION |
| OTHERS |

*FIG. 3*

WORD PROCESSOR UTILIZING IMAGE INPUTTING MEANS

BACKGROUND OF THE INVENTION

This invention relates to a word processor capable of inputting only specific items and printing them on predetermined positions of a fixed document form such as bussiness letter forms, debit note forms or the like.

The word processors are often used not to prepare a whole document but to prepare some data to be printed on some specific positions of the fixed document forms. Minute care must be taken, however, in order to correctly print the prepared data on the margins of the documents. Otherwise, there arise such problems as displacement of the positions of the printed data and/or the off-set thereof.

For avoiding the above problems, in conventional word processors, the following processings have been usually carried out.

Type 1) A printer of the type in which a priting format can be set by moving a printing head is used for preparing a format corresponding to each fixed document form and the data prepared by the word processor are printed on the fixed document form in accordance with the printing format as above prepared.

Type 2) A commercially available application program prepared for a specific document form is used so as to enable to input and print only the necessary items on the specific document form.

With the type 1) processing, however, a special printer must be used and the operation therefor is troublesome. Further, processing therefor must be carried out each time even for printing on the same document form when it is carried out after the time has passed. On the other hand, with the type 2) processing, the operation becomes easy and easily repeatable but the document form other than the specially prepared one for each application program can not be used and therefore any individual modification on a document form can not be done.

SUMMARY OF THE INVENTION

Accordingly, it is an object of this invention to provide a novel word processor capable of eliminating the above problems of the prior arts.

Another object of this invention is to provide a novel word processor capable of accurately printing specific items on predetermined positions of a fixed document forms without utilizing a special printer.

Other object of this invention is to provide a novel word processor capable of printing specific items on predetermined positions of various kind of fixed form documents without preparing respective application program therefor.

According to this invention, there is provided a word processor for inputting desired data only for necessary items and printing them on predetermined positions of a fixed document form by utilizing a printing device, which comprises; means for inputting an image of said fixed document form; graphic display means for displaying the inputted image of the fixed document form; means for setting input positions on said fixed document form displayed on said display means; means for inputting desired data for each said input position; and means for controlling said printing device for printing the inputted data at said predetermined positions on said fixed document form based on the contents of said stored amounts of movements.

BRIEF DESCRIPTION OF THE ACCOMPANYING DRAWINGS

FIG. 2 shows one example of a fixed document form on which specific items are partly printed with the word processor embodying the invention;

FIG. 3 shows one example of the format data prepared for each of columns on the fixed document form where specific items are printed with the word processor embodying the invention;

DESCRIPTION OF THE PREFERRED EMBODIMENT

Figure 1:
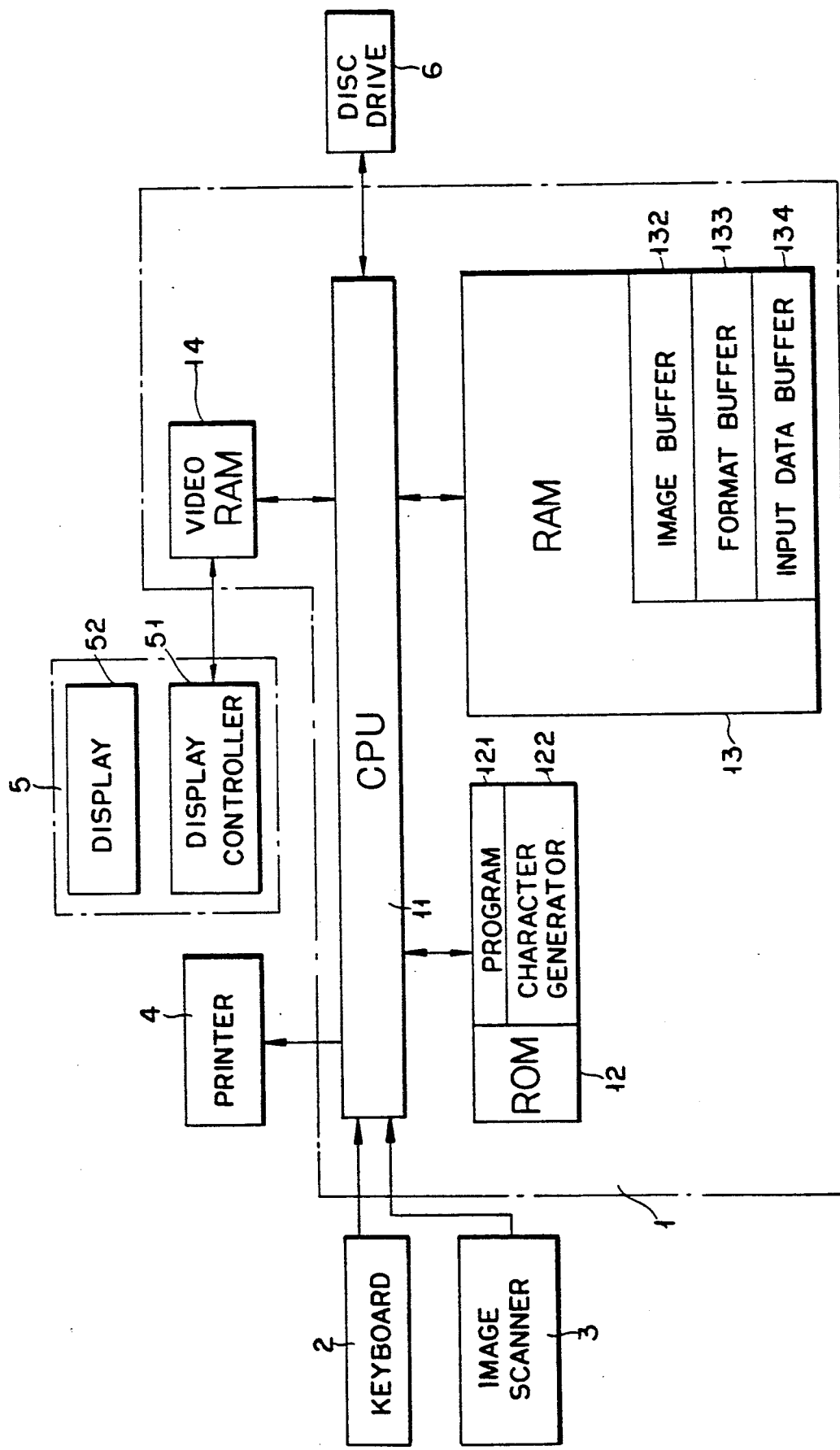
FIG. 1 is a block diagram showing one example of the fundamental construction of a word processor embodying the invention.

FIG. 1 is a block diagram showing a fundamental construction of a word processor embodying the invention. In this embodiment, a keyboard 2 and an image scanner 3 are both utilized as an alternative input device while a printer 4 and a display unit 5 are utilized as an alternative output device.

A control unit 1 comprises a central processing unit (CPU) 11, a read only memory (ROM) 12, a randam access memory (RAM) 13 and a Video RAM 14.

The ROM 12 comprises a program memory 121 wherein operating program, printing control program, display control program, editing program, formatting program and other programs are stored, and a character generator 122 for outputting signals corresponding to each code data inputted from the keyboard 2 to a display controller 51 or a printer 4 for displaying or printing corresponding letters and/or symbols.

In the RAM 13, an image buffer 132 and a format buffer 133 and an input data buffer 114 are provided as well as an input data buffer 134 and other buffers and/or memories.

Into the image buffer 132 of the RAM 13, an image data is inputted through the CPU 11 from the image scanner 3, while code data is inputted into the input data buffer 134 through the CPU 11 from the keyboard 2.

The Video RAM 14 has a capacity of storing code data corresponding to one screen frame of the CRT display 52.

FIG. 2 shows an example of a fixed document form onto which desired data are to be partly printed. More particularly, illustrated example is a debit note form and the name, number, date, respective amounts and total amount are to be printed into each corresponding columns formed thereon.

FIG. 3 shows one example of the format data to be prepared for each column of the above debit note form illustrated in FIG. 2. More particularly, the data comprise a printing starting position, a printing termination position, the type of characters, the size of characters, the character embellishment, the row edition and etc.

Figure 4:
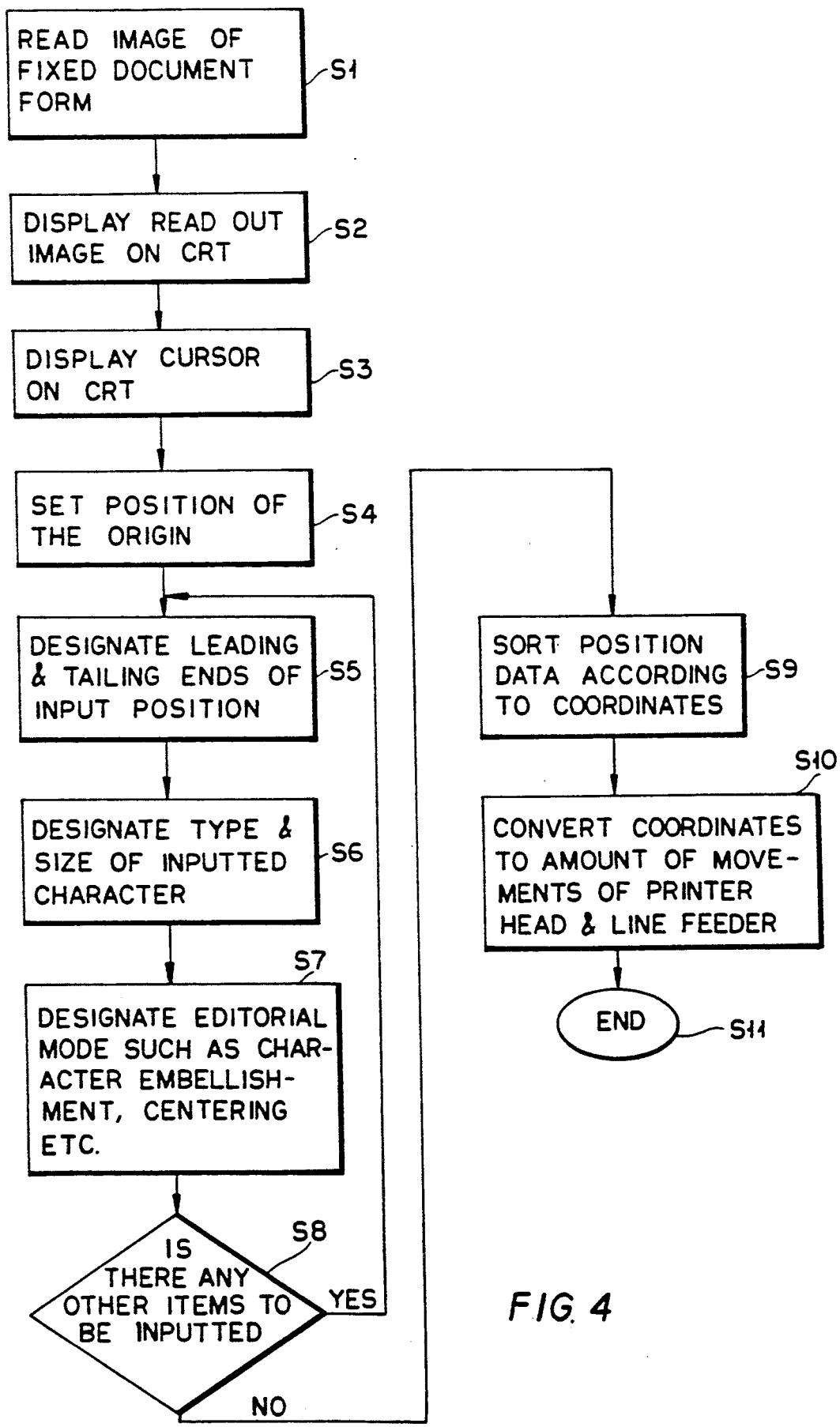
FIG. 4 is a flow chart for preparing a format for each fixed document form.

FIG. 4 is a flow chart briefly showing the steps of the formatting program stored in the program memory 121 of the ROM 12.

At first, the image of a fixed document form such as illustrated in FIG. 2 is read by the image scanner 3 and inputted to be stored in the image buffer 132 of the RAM 13 (step S1). Then, the stored image of the fixed document form is displayed on the CRT display 52 (step S2).

At step S3, a cursor which moves in a dot unit is displayed on the CRT display 52. By moving the cursor, not shown, to some position on the CRT display 52, the position of the origin on the fixed document form is set (step S4). This step is necessary for the purpose of specifying the positional relationship between the designated columns on the fixed document form. It is usual and advantageous to use the left upper corner of the fixed document form displayed on the screen of the CRT display 52 as the origin.

After the origin is set, then, the leading and tailing ends of one of the columns (for instance, the column for NAME on the debit note shown in FIG. 2) into which specific item is to be inserted are designated by moving the cursor so that the rectangular coordinates (x,y) and (x',y') of the input starting position and the termination position with reference to the origin are stored in the format buffer 133 of the RAM 13 (step S5).

Succeeded to this step, the type of the character (for example Japanese Kana, English Alphabet and etc.) and the size of the character (for example half size, normal size, double size and etc.) are designated (step S6). Then, such data related to editorial mode as character emblichment (for example a line screening, shift to the right, centering, decimal tub, equal allotment and etc.) are designated (step S7). These designated data are also stored in the format buffer 133 of the RAM 13 together with the position data designated in the above step S4.

At step S8, a question is made as to whether there is other column desired to be designated. When the answer of an operator is YES, then the program is returned to step S5 for repeating the above steps S5-S8.

When the answer is NO, the program goes to the next step S9 where the inputted formats stored in the format buffer 133 are sorted according to the order of the coordinates (x,y) of the input starting positions.

Thereafter, for each stored data, coordinate x is converted into the amount of movement of the printing head, not shown, of the printer 4 while the coordinate y is converted into the amount of movement of the line feeder, not shown, of the printer 4 (step S10).

Thus, the formatting processing in accordance with the formatting program stored in the ROM 12 is completed and informed to an operator.

It is advantageous to once transfer the contents of the image buffer 132 and the format buffer 133 to the external memory device so as to make it possible to repeatedly use the format data without setting each time for inputting and printing the desired data on the same document form.

Figure 5:
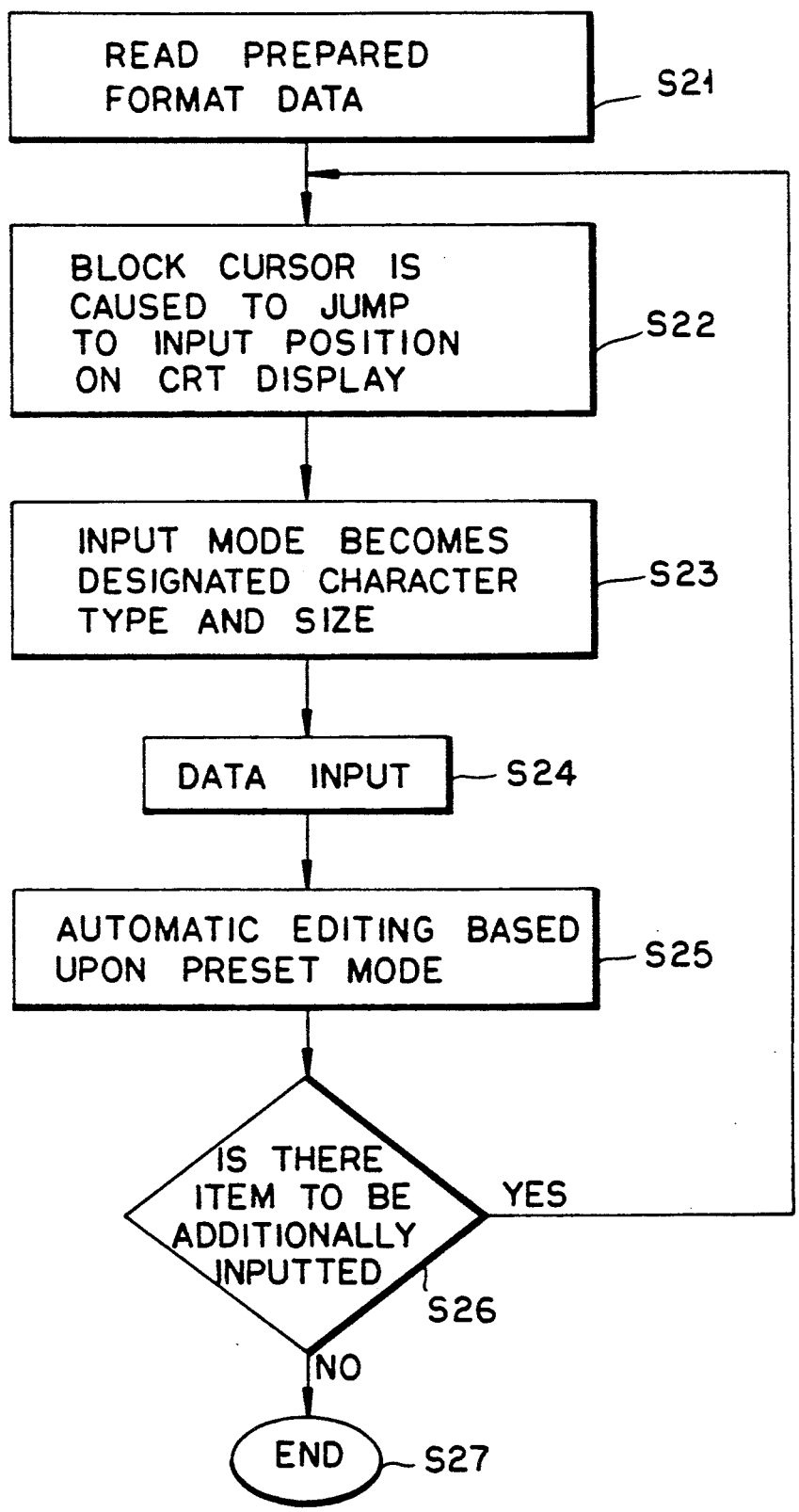
FIG. 5 is a flow chart for inputting desired data by using the prepared format therefor.

FIG. 5 is a flow chart showing processings of inputting data of the specific items to be printed on the fixed document form by utilizing the format data prepared as above. Such processings are regulated by the program stored in the ROM 12 and processed on a text picture so that an operator can input desired data from the keyboard 2 while viewing the document form displayed on the CRT display 52.

First, the format data prepared and stored in the RAM 13 as above are read out and the image of the fixed document form is displayed on the CRT display 52 (step S21). When the format data is stored in the external memory device such as a floppy disc, not shown, it is necessary of course to transfer them into the image and format buffers 132 and 133 of the RAM 13 through a disc driver 6 and so on.

Then, a block cursor, not shown, are displayed on the CRT display 52 and is caused to jump to the first input item position (step S22) and the input mode is automatically set to the pre-designated character type and the character size (step S23).

Under this state, desired data are inputted by an operator from the keyboard 2 and then the character emblichment, line edition and etc. are executed automatically for each input data (step S25).

Then, a judgement is made as to whether there is an item to be additionally inputted (step S26). When the result of this judgement is YES, the program is returned to the step S22 to repeat the steps S22 through S26, whereas when the result of this judgement is NO, the processing is terminated.

When printing the data thus inputted, the fixed document form such as illustrated in FIG. 2 is set on the printer 4 by taking into consideration the left upper corner thereof is utilized as the origin of the printing position. In other words, the left end of the document form is set to the home position of the printing head and the leading end of the document is set to a position at which the top position sensor, not shown, detects the leading edge of the document form.

When the printing is started from such position, the printing head and the line feeder are moved to the designated cordinates (x,y) of various items in accordance with the sorted order thereof by the signals generated by the printing control program stored in the ROM 12 based upon the contents of the format buffer 133 of the RAM 13 and the characters and/or the symbols are accurately printed at correct positions on the fixed document form based upon the contents of the format buffer 133 and the input data buffer 134.

Meanwhile, although in the above embodiment, items of the columns such as "Professional Charge US$" are all preprinted on the debit note form shown in FIG. 2, the flow chart of the formatting program indicated in FIG. 4 may be of course arranged to add new items on the fixed document form displayed on the CRT 52 and stored them in OTHERS section, as illustrated in FIG. 3, of the format buffer 133 together with the position data and so on designated therefor. Thus, it is also possible to prepare the format data by adding all items and/or titles on the document form which is read in by the image scanner 3 and only ruled lines are preprinted on. With this modification, many kinds of the document form can be easily prepared from one form on which merely the ruled lines are preprinted.

As above described, with the word processor according to the present invention, the format data for various kinds of fixed document forms can be easily and flexibly prepared by an operator, and since the desired data can be inputted while confirming the columns of the fixed document form on the graphic display means processing therefor becomes very easy.

What is claimed is:

1. A word processor for inputting desired data only for necessary items and printing them at predetermined positions of a fixed document form by utilizing a printing device, which comprises;
  means for inputting an image of said fixed document form;
  graphic display means for displaying the inputted image of the fixed document form;

means for setting and storing input positions on said fixed document form displayed on said display means;

means for setting writing mode format data for each said input position;

means for storing said writing mode format data, including means for storing items and/or titles in connection with each said writing mode format data;

means for inputting desired data for each of said input positions; and means for controlling said printing device for printing the inputted data at said predetermined positions on said fixed document form based on said stored input positions.

2. The word processor according to claim 1 which further comprises means for converting a position data of each said input position to the amounts of movements of a printing head and a line feeder of said printing device, and means for storing said amounts of movements for each position data.

3. The word processor according to claim 1 which further comprises means for sorting said input position data based upon coordinates thereof.

4. The word processor according to claim 3 which further comprises means for displaying a cursor on the displayed image of said fixed document form, and means for jumping said cursor from one to another of said stored input positions.

5. The word processor according to claim 1 which further comprises means for storing said image data of the fixed document form.

* * * * *